United States Patent
Bharucha et al.

(10) Patent No.: US 6,229,821 B1
(45) Date of Patent: *May 8, 2001

(54) SERIAL DATA TRANSMISSION OF VARIABLE LENGTH MINI PACKETS USING STATISTICAL MULTIPLEXING

(75) Inventors: Behram H. Bharucha, Millburn; Thomas P. Chu, Englishtown, both of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/847,949

(22) Filed: Apr. 22, 1997

Related U.S. Application Data

(63) Continuation of application No. 08/847,949, filed on Apr. 22, 1997.

(51) Int. Cl.⁷ .................................................. H04J 3/16
(52) U.S. Cl. ...................... 370/471; 370/496; 370/469; 370/537
(58) Field of Search ................................... 370/466, 469, 370/470, 471, 473, 474, 476, 512, 478, 480, 510, 509, 514, 537–540, 465, 463, 475, 493–496, 535; 709/231, 236

(56) References Cited

U.S. PATENT DOCUMENTS

| | | | |
|---|---|---|---|
| 4,935,925 | * | 6/1990 | Williams et al. ............... 370/472 |
| 4,941,089 | * | 7/1990 | Fischer ............................ 370/473 |
| 5,444,709 | * | 8/1995 | Riddle ............................. 370/472 |
| 5,488,610 | * | 1/1996 | Morley ............................ 370/471 |
| 5,519,640 | * | 5/1996 | Ganesan .......................... 709/236 |
| 5,535,221 | * | 7/1996 | Hijikata et al. ................. 370/471 |
| 5,774,469 | * | 6/1998 | Wirkestrand .................... 370/473 |
| 5,802,050 | * | 9/1998 | Petersen et al. ................ 370/473 |
| 5,987,034 | * | 11/1999 | Simon et al. ................... 370/474 |

FOREIGN PATENT DOCUMENTS

065951 A2    12/1995  (EP) .

OTHER PUBLICATIONS

U.S. application No. 05/570362, Nishimura, filed Oct. 29, 1996.

Johnson, M. et al.: "Support for low Bitrate applications in ATM Networks"; Proceedings of IFIP Workshop on Performance Modelling and Evaluation of ATM Networks, Jun. 3, 1996, pp. 39/1–39/14, XP002045906 * section 5 *.

Ott, M. A. et al.: "Prototype ATM Lan System Multimedia on Demand Applications"; NEC Research and Development, vol. 35, No. 4, Oct. 1, 1994, pp. * section 3.5 *.

"Digital Telepony" Second Edition, John Bellamy, pp. 210–215.

* cited by examiner

*Primary Examiner*—Wellington Chin
*Assistant Examiner*—Steven Nguyen
(74) *Attorney, Agent, or Firm*—Kenyon & Kenyon

(57) ABSTRACT

AAL2 mini packets are integrated directly onto the physical layer to provide serial data transmission using statistical multiplexing. This can be achieved by generating a plurality of frames of a predetermined size. A plurality of AAL2 variable length mini packets are then statistically multiplexed onto the plurality of frames. A pointer field is then inserted into each of the frames. The pointer field includes a pointer that delineates the starting place of the next full packet in the frame that includes the pointer field, a framing bit that forms a pattern with other framing bits, and a parity bit. The frames are then transmitted over a serial transmission line.

17 Claims, 2 Drawing Sheets

SERIAL DATA TRANSMISSION OF VARIABLE LENGTH MINI PACKETS USING STATISTICAL MULTIPLEXING

This is a continuation of application Ser. No. 08/847,949, filed on Apr. 22, 1997.

BACKGROUND OF THE INVENTION

The present invention is directed to data transmission. More particularly, the present invention is directed to serial data transmission of variable length mini packets using statistical multiplexing.

Public telephone carriers offer many digital services that customers can subscribe to. Some digital services allow the customer to multiplex multiple telecommunication applications (e.g., a PBX and computer data equipment) located at the customer's premise onto a single access circuit.

One example of a single access circuit is a T1 circuit. A T1 circuit includes multiple frames, with each frame including twenty-four time slots, and each time slot including eight bits of information. A T1 circuit utilizes synchronous time division multiplexing ("TDM") to multiplex together information from multiple telecommunication applications. Synchronous TDM allocates time slots, or bandwidth, on a per application basis. However, this means that when an application is not using its assigned time slots during idle time, the time slots cannot be used by other applications. Therefore, time slots are frequently unused, and the usage efficiency of the T1 circuit is decreased.

Another example of a single access circuit is an Asynchronous Transfer Mode ("ATM") circuit. ATM utilizes a form of multiplexing known as statistical multiplexing ("STM"). With STM, bandwidth is shared among all telecommunication applications, and bandwidth is used by an application only when needed. Thus the bandwidth in an ATM circuit is typically more fully utilized than with a T1 circuit.

All information in ATM is carried in the form of fixed-length data units called cells. FIG. 1 illustrates the structure of an ATM cell 10. The ATM cell 10 consists of a five octet (one octet equals one byte) header 14 and a forty-eight octet payload 12.

Uncompressed voice typically is digitized at a rate of 64 Kbps. At that rate, it takes approximately six milliseconds to fill up the forty-eight octet payload 12 of ATM cell 10. The six millisecond delay is an acceptable delay in a typical voice telephony system.

An ATM circuit can be used more efficiently if the voice is compressed using one of many known compression techniques. However, compressing the voice increases the delay for filling up ATM cell 10. For example, using known methods (e.g., International Telecommunication Union ("ITU") standard G.729 (CS-ACELP) or ITU standard G.723.1 (MP-MLQ)), voice can be compressed to a rate of eight Kbps or below, with very good quality. At a rate of eight Kbps, it takes approximately forty-eight milliseconds to fill up the forty-eight octet payload 12 of ATM cell 10. A forty-eight millisecond delay is noticeable to a user of a voice telephony system, so it is an unacceptable delay. Therefore, it is desirable to have smaller packet sizes than forty-eight octets so that they can be filled more quickly and reduce delay.

In addition, when using compressed voice, the logical unit of octets that must be read by the receiving device is varied depending on the compression technique used. Specifically, with uncompressed voice, the logical unit is one octet (i.e., the receiving device can decode received compressed voice on a one octet basis). However, with compressed voice, the logical unit changes because typically the receiving unit must receive multiple octets to decode the voice. For example, when voice is compressed to eight Kbps using the G.723.1 standard, the logical unit is twenty-four octets. However, when voice is compressed using the G.729 standard, the logical unit is ten octets. Multiple ten octet units do not evenly fit into the forty-eight octet payload 12 of ATM cell 10. Therefore, it is desirable to have packets of variable size to accommodate different logical unit sizes.

One known method to reduce the delay of transmitting compressed voice and to accommodate varied logical units is to utilize small packets (referred to as "mini packets") of variable length and integrate them into ATM cells. This method utilizes an ATM Adaption Layer-2 ("AAL2") adaption layer. The AAL2 adaption layer is promulgated by ITU standard I.363.2.

FIG. 2 illustrates the AAL2 layer in comparison to the ATM layer. As shown in FIG. 2, the AAL2 layer 16 is the layer above the ATM cell layer 17. The AAL2 layer specifies how higher layer data (data layer 15), in this case mini packets, should be packed into ATM cells and transmitted on the physical layer 18 (i.e., the structure which carries the data, such as a fiber optic cable).

FIG. 3 illustrates the structure of an AAL2 mini packet. The mini packet 20 includes a three octet packet header 24 and a packet payload 22. Packet payload 22 can be one to sixty-four octets long.

AAL2 mini packets are packed onto ATM cells in a stream fashion (i.e., one after the other). FIG. 4 illustrates multiple AAL2 mini packets 36, 37, 38, 39 packed onto two ATM cells 30, 31. Each ATM cell 30, 31 in addition to including an ATM header 32, 33 must also include a message start pointer ("MSP") 34, 35. The MSP includes a six bit pointer, a one bit sequence number, and a one bit parity. The six bit pointer delineates the starting place of the next packet within the ATM cell. Mini packets can span multiple ATM cells. For example, in FIG. 4 mini packet 38 spans both ATM cell 30 and ATM cell 31.

One problem with the AAL2 method of using AAL2 packets within ATM cells to transmit variable mini packets is that a large overhead is incurred. This large overhead reduces transmission efficiency.

Specifically, at the packet level AAL2 requires a three octet mini packet header. At the cell level AAL2 requires six octets of overhead (a five octet ATM header and a one octet MSP). However, because an ATM cell can carry multiple packets, the six octets of overhead must be prorated among the packets. For an AAL2 packet whose payload is "L" octets long, the cell level overhead is (L+3)*(6/47). The total overhead is 3+(L+3)*(6/47). Table 1 gives some examples of the overhead incurred with AAL2 for various packet lengths:

TABLE 1

| Packet Payload | Overhead | |
|---|---|---|
| (octets) | (octets) | (percentage) |
| 8 | 4.40 | 55.1% |
| 16 | 5.43 | 33.9% |
| 24 | 6.45 | 26.9% |

TABLE 1-continued

| Packet Payload | Overhead | |
| --- | --- | --- |
| (octets) | (octets) | (percentage) |
| 32 | 7.47 | 23.3% |
| 47 | 9.51 | 19.8% |

Another problem is that ATM, in accordance with ATM standards, cannot operate at speeds slower than a T1 circuit (i.e., 1.544 Mbps). Therefore, the speed of AAL2, which is mapped onto an ATM cell, also cannot be operated at speeds slower than a T1 circuit.

Based on the foregoing, there is a need for a method and apparatus for serial data transmission of variable length mini packets using statistical multiplexing which incurs a smaller overhead than using the known combination of AAL2 and ATM, and further is able to operate at speeds slower than a T1 circuit.

SUMMARY OF THE INVENTION

One embodiment of the present invention satisfies the above needs, and others, by integrating AAL2 mini packets directly onto the physical layer to provide serial data transmission using statistical multiplexing. In one embodiment of the present invention, this is achieved by generating a plurality of frames of a predetermined size. A plurality of AAL2 variable length mini packets are then statistically multiplexed onto the plurality of frames. A pointer field is then inserted into each of the frames. The pointer field includes a pointer that delineates the starting place of the next full packet in the frame that includes the pointer field, a framing bit that forms a pattern with other framing bits, and a parity bit. The frames are then transmitted over a serial transmission line.

DETAILED DESCRIPTION

Figure 5:
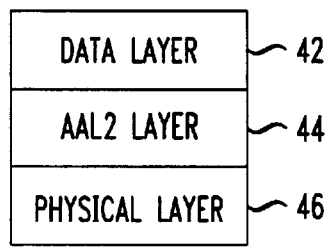
FIG. 5 illustrates the layers used in one embodiment of the present invention.

The present invention reduces packet overhead and is able to run at speeds slower than a T1 line by eliminating the ATM layer that is integrated with the AAL2 layer in the prior art. FIG. 5 illustrates the layers used in one embodiment of the present invention. As shown in FIG. 5, an AAL2 packet layer 44 is directly above the physical layer 46, and the data layer 42 is above the AAL2 layer 44. Therefore, AAL2 packets, or their equivalents, are mapped directly onto the physical layer 46. In one embodiment, a framing structure is provided on physical layer 46.

Figure 6:
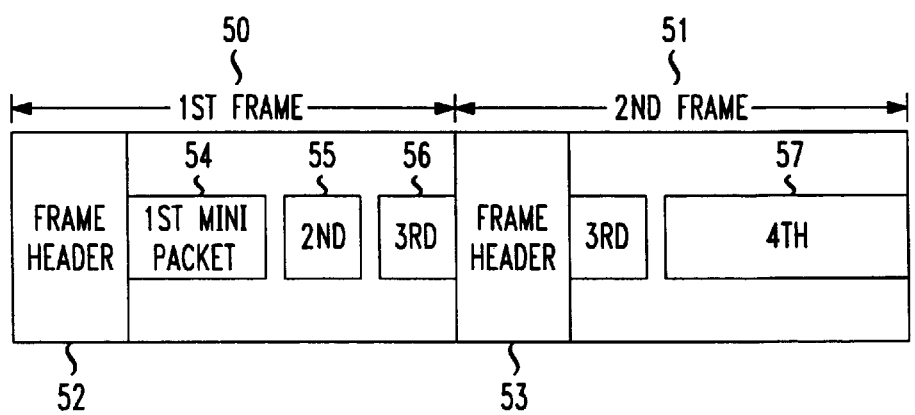
FIG. 6 illustrates the structure of two frames that result from one embodiment of the present invention.

FIG. 6 illustrates the structure of two frames that result from one embodiment of the present invention. Each frame 50, 51 includes a frame header 52, 53 inserted at the beginning of the frame, and AAL2 mini packets 54, 55, 56, 57. Mini packets, such as mini packet 56, can span multiple frames. The size of each frame can vary in size but is fixed once it is selected. The selected size of the frame is optimized based on a number of factors including error loss, resynchronization speed and packing efficiency. When a shorter frame size is selected, overhead is increased because more frame headers are used. However, when a larger frame size is selected, error losses increase because more packets are lost when a frame is lost. Further, with a larger frame size, resynchronization time is increased because, as described below, resynchronization requires reading a plurality of frame headers.

Frames 50, 51 can be generated by, for example, a general purpose computer that includes a processor and a storage device, or by any known frame generating device.

Figure 1:
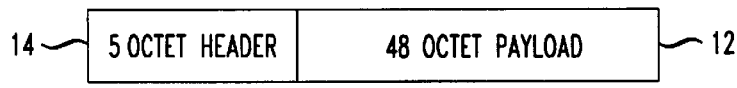
FIG. 1 illustrates the structure of an ATM cell.
Figure 2:
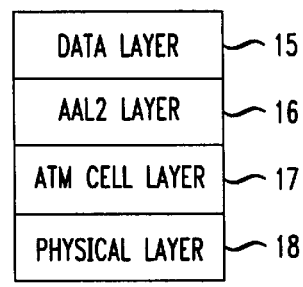
FIG. 2 illustrates an AAL2 layer in comparison to an ATM layer.
Figure 3:
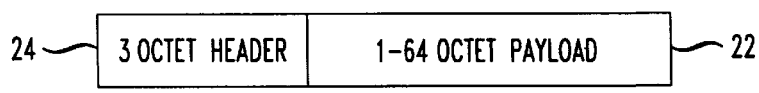
FIG. 3 illustrates the structure of an AAL2 mini packet.
Figure 4:
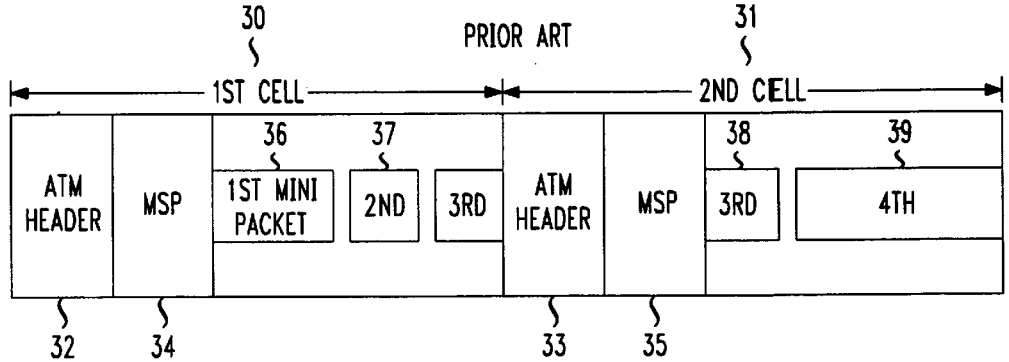
FIG. 4 illustrates multiple AAL2 mini packets packed onto two ATM cells.
Figure 7:
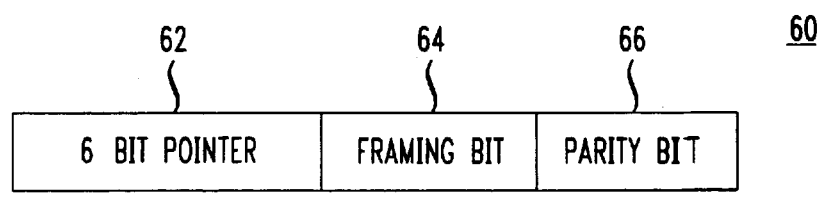
FIG. 7 illustrates the structure of a frame header inserted at the beginning of each frame in one embodiment of the present invention.

FIG. 7 illustrates the structure of the frame header inserted at the beginning of each frame in one embodiment of the present invention. Frame header 60 is similar to MSP 34, 35 shown in FIG. 4. Frame header 60 includes a six bit pointer 62, a one bit framing bit 64, and a one bit parity bit 66. The six bit pointer 62 delineates the starting place of the next packet within the frame. The framing bit 64 forms a pattern across multiple frames that is used for sequencing and synchronizing the frames. Use of a framing bit pattern to sequence and synchronize frames is a known technique that is implemented, for example, with T1 communication lines and is disclosed in J. Bellamy, Digital Telephony, Second Edition, John Wiley & Sons, Inc., pp. 210–215 (1991), incorporated herein by reference, The technique is also disclosed in conjunction with ITU standard G.704.

The method of mapping AAL2 packets directly to the physical layer in accordance with the present invention results in reduced overhead in comparison to the AAL2 method which maps AAL2 packets to ATM cells. For example, a popular telecommunication service is Accunet Spectrum of Digital Services ("ASDS") which is a leased line digital service available from AT&T Corp. In ASDS, the payload of the circuit is N×64 Kbps. ASDS utilizes T1 frames, but N time-slots are used instead of the entire T1 frame. For example, if the circuit is 256 Kbps, four time slots of the twenty-four time slots in a T1 frame would be used.

In order to implement ASDS using the present invention, the size of the frame must first be determined. At this speed (256 Kbps), a reasonable tradeoff between efficiency and delay would be a frame of 24–48 octets. At the beginning of each frame, a pointer header would be inserted as the first octet of each frame. Under this mode, with a frame size of 24 octets, the overhead per packet for an L octet packet would be $3+(L+3)/24$ which is better than the AAL2 over ATM case.

Note that this is a comparison between two variable length packet schemes. In general, variable length packet schemes have better packing efficiency than fixed length schemes such as ATM. For example, the most common data packet in the Internet Protocol ("IP") environment is the Transmission Control Protocol/Internet Protocol ("TCP/IP") acknowledge packet which requires two ATM cells (53×2= 106 octets) to send. However the actual payload is only 56 octets because the overhead is 50 octets (20 octet IP header, 20 octet TCP header, 8 octet SNAP header, plus 8 octet AAL5 trailer). To send the same information with AAL2 over ATM would incur an overhead of $3+(56+3)*6/47=10.5$ octets. However, to send the same information with AAL2 directly over a 24 octet long frame using the present invention, an overhead of only $3+(56+3)/24=5.46$ octets is incurred.

As described, the present invention integrates AAL2 mini packets directly onto the physical layer to provide serial data transmission using statistical multiplexing. The present invention reduces the overhead in comparison to the prior art, can operate at speeds slower that a T1 communication line, and utilizes variable length packets.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, the variable length mini packets are not limited to AAL2 mini packets in the present invention. Any type of variable length mini packets can be used. Further, the frame size can be greater than 64 octets, as long as the pointer 62 is also increased in size to accommodate more than 64 octets.

What is claimed is:

1. A method of transmitting a plurality of variable length mini packets over a serial transmission line, each variable length mini packet having a header, comprising the steps of:
   a) generating a plurality of physical layer frames of a predetermined size;
   b) statistically multiplexing the variable length mini packets directly onto said plurality of physical layer frames;
   c) inserting a pointer field into each of said physical layer frames, wherein said pointer field comprises:
      a pointer that delineates the starting place of the next full variable length mini packet in a physical layer frame that includes the pointer field;
      a framing bit that forms a pattern with other framing bits; and
      a parity bit; and
   d) transmitting said physical layer frames directly over the serial transmission line.

2. The method of claim 1, wherein the variable length mini packets are AAL2 mini packets.

3. The method of claim 1, wherein said predetermined size is at least twenty-four octets and at most sixty-four octets.

4. The method of claim 1, wherein said predetermined size is based on line speed, delay requirements and packing efficiency.

5. The method of claim 1, wherein the pattern provides sequencing and synchronizing.

6. A system for transmitting a plurality of variable length mini packets over a serial transmission line, each variable length mini packet having a header, said system comprising:
   means for generating a plurality of physical layer frames of a predetermined size;
   means for statistically multiplexing the variable length mini packets directly onto said plurality of physical layer frames;
   means for inserting a pointer field into each of said physical layer frames, wherein said pointer field comprises:
      a pointer that delineates the starting place of the next variable length mini packet in a physical layer frame that includes the pointer field;
      a framing bit that forms a pattern with other framing bits; and
      a parity bit; and
   means for transmitting said physical layer frames directly over the serial transmission line.

7. The system of claim 6, wherein the variable length mini packets are AAL2 mini packets.

8. The system of claim 6, wherein said predetermined size is at least twenty-four octets and at most sixty-four octets.

9. The system of claim 6, wherein said predetermined size is based on line speed, delay requirements and packing efficiency.

10. The system of claim 6, wherein the pattern provides sequencing and synchronizing.

11. A system for transmitting a plurality of variable length mini packets over a transmission line, each variable length mini packet having a header, said system comprising:
    means for generating a plurality of physical layer frames of a predetermined size;
    means for statistically multiplexing the variable length mini packets directly onto the plurality of physical layer frames;
    means for inserting a pointer field into each of said physical layer frames, wherein said pointer field comprises:
       a pointer that delineates the starting place of the next full variable length mini packet in a physical layer frame that includes the pointer field;
       a framing bit that forms a pattern with other framing bits; and
       a parity bit; and
    means for transmitting said physical layer frames directly over the transmission line.

12. A method of transmitting a plurality of variable length mini packets over a physical layer structure that carrier data, each variable length mini packets having a header, comprising the step of:
    generating a plurality of physical layer frames by providing a framing structure on the physical layer, the physical layer frames having a predetermined size;
    statistically multiplexing the variable length mini packets directly onto the plurality of physical layer frames;
    inserting a pointer field into each of plurality of physical layer frames wherein said pointer field comprises:
       a pointer that delineates the starting place of the next full variable length mini packet in the physical layer frame that includes the pointer field;
       a frame bit that forms a pattern with other framing bits; and
       a parity bit; and
    transmitting the physical layer frames.

13. The method of claim 12, wherein the variable length mini packets arc AAL2 mini packets.

14. The method of claim 12, wherein the predetermined size is at least twenty-four octets and at most sixty-four octets.

15. The method of claim 12, wherein the predetermined size is based on line speed, delay requirements and packing efficiency.

16. The method of claim 12, wherein the pattern provides sequencing and synchronizing.

17. An apparatus for transmitting data over a physical layer structure that carries data, comprising:
    a processor; and
    a storage device coupled to said processor, said storage device storing instructions adapted to be executed by said processor to:

generate a plurality of physical layer frames by providing a framing structure on the physical layer, the physical layer frames having a predetermined size, statistically multiplex a plurality of variable length mini packets directly onto the plurality of physical layer frames, each variable length mini packet having a header, insert a pointer field into each of said physical layer frames, wherein said pointer field comprises:

a pointer that delineates the starting place of the next full variable length mini packet in a physical layer frame that includes the pointer field;

a framing bit that forms a pattern with other framing bits; and a parity bit; and transmit the physical layer frames over the physical layer.

* * * * *